United States Patent
Yamada

(10) Patent No.: US 9,701,503 B2
(45) Date of Patent: Jul. 11, 2017

(54) NON-PRINTED PAPER SUPPLY APPARATUS USED FOR SINGLE-SIDE PRINTER

(71) Applicant: JSOFFSET CORPORATION, Hiroshima-shi (JP)

(72) Inventor: Syuuji Yamada, Hiroshima (JP)

(73) Assignee: JSOFFSET CORPORATION, Hiroshima-shi (JP)

( * ) Notice: Subject to any disclaimer, the term of this patent is extended or adjusted under 35 U.S.C. 154(b) by 74 days.

(21) Appl. No.: 14/885,382

(22) Filed: Oct. 16, 2015

(65) Prior Publication Data

US 2016/0130103 A1  May 12, 2016

(30) Foreign Application Priority Data

Nov. 10, 2014 (JP) ................................ 2014-228121

(51) Int. Cl.
*B65G 7/08* (2006.01)
*B65H 15/02* (2006.01)
(Continued)

(52) U.S. Cl.
CPC ............. *B65H 15/02* (2013.01); *B65H 31/26* (2013.01); *B65H 31/34* (2013.01); *B65B 1/24* (2013.01);
(Continued)

(58) Field of Classification Search
CPC ......... B65B 11/585; B65B 1/24; B65B 13/02; B65B 17/025; B65B 1/00; B65B 5/00;
(Continued)

(56) References Cited

U.S. PATENT DOCUMENTS 1,486,609 A * 3/1924 Schwab .................... B65G 7/08
                                                                  294/67.3
2,656,051 A * 10/1953 Jenkins .................... B66C 1/125
                                                                  414/758
(Continued)

FOREIGN PATENT DOCUMENTS

DE         3132952 A1    3/1983
JP         S57-67445     4/1982
(Continued)

OTHER PUBLICATIONS

Extended European Search Report dated May 9, 2016 for the corresponding European patent Application No. 15192534.4.

*Primary Examiner* — Jeffrey Shapiro
(74) *Attorney, Agent, or Firm* — Kratz, Quintos & Hanson, LLP

(57) ABSTRACT

A supply apparatus for paper of which one side is printed and another side is not printed and which is used for a single-side printer much cheaper than a double-side printer and having a smaller occupied area than that of the double-side printer is improved to be easily, promptly, safely, and surely set.
A supply apparatus reverses a plurality of sheets of stacked paper of which one side has been printed so that a non-printed surface comes to an upper surface and supplies the stacked paper to a printer again. The non-printed paper supply apparatus for the single-side printer includes two palettes which sandwich and hold the stacked paper from upper and lower sides, a plurality of alignment holding tools which is provided between the palettes and is adjusted according to a volume of the stacked paper, a pair of fastening and reversing tools including reversing bars in which reversing shafts for reverse are formed on sides of the palettes opposite to each other, and a pair of reverse assisting stands which pivotally support reversing shafts of each
(Continued)

fastening and reversing tool. The alignment holding tool and the fastening and reversing tool are respectively fixed to upper/lower palettes with fixing tools which are attached/detached in a single operation.

4 Claims, 12 Drawing Sheets

(51) Int. Cl.

| | | |
|---|---|---|
| *B65H 31/26* | (2006.01) | |
| *B65H 31/34* | (2006.01) | |
| *B65B 1/24* | (2006.01) | |
| *B65D 19/00* | (2006.01) | |
| *B65D 19/38* | (2006.01) | |
| *B65D 19/40* | (2006.01) | |
| *B65D 19/44* | (2006.01) | |
| *B65D 19/42* | (2006.01) | |
| *B65D 19/20* | (2006.01) | |
| *B65H 1/04* | (2006.01) | |
| *B65H 31/30* | (2006.01) | |

(52) U.S. Cl.
CPC ............ *B65D 19/00* (2013.01); *B65D 19/20* (2013.01); *B65D 19/38* (2013.01); *B65D 19/40* (2013.01); *B65D 19/42* (2013.01); *B65D 19/44* (2013.01); *B65G 7/08* (2013.01); *B65H 1/04* (2013.01); *B65H 31/3036* (2013.01); *B65H 31/3045* (2013.01); *B65H 2301/42256* (2013.01); *B65H 2801/31* (2013.01)

(58) Field of Classification Search
CPC B65B 7/00; B65B 25/02; B65B 25/04; B65B 67/00; B65B 67/02; B65B 67/08; B65B 67/10; B65G 7/08; B65G 47/248; B65G 47/252; B65H 15/00; B65H 15/02; B65H 2301/33214; B65H 3/0684; B65H 2405/354; B65H 1/00; B65H 2405/00; B65H 1/04; B65H 31/26; B65H 31/34; B65H 2301/42256; B65H 2801/31; B65H 31/20; B65H 31/22; B65H 31/3036; B65H 31/3045; B65D 19/00; B65D 19/385; B65D 19/40; B65D 19/42; B65D 19/44; B65D 19/20; B65D 71/0088; B65D 71/0092; B65D 71/0096
USPC ..... 414/758; 248/127, 130, 133, 158, 176.1, 248/229.12, 229.14, 229.22, 229.24, 248/228.14, 228.3, 228.5, 231.21, 231.41, 248/231.61; 220/4.03, 4.28, 4.33, 8; 53/411, 131.1, 392; 269/3, 6, 95, 166; 100/56; 294/119.1, 34, 86.41; 101/407, 101/407.1, 474, 232; 206/386, 595–600; 74/132, 135, 422; 271/127, 145
See application file for complete search history.

(56) References Cited

U.S. PATENT DOCUMENTS

| | | | | |
|---|---|---|---|---|
| 4,070,767 | A * | 1/1978 | Woodward | B41F 23/00 34/164 |
| 4,498,841 | A * | 2/1985 | Wickstrom | B65G 7/08 280/47.12 |
| 6,443,688 | B1 * | 9/2002 | Komdeur | B65G 7/08 280/47.12 |
| 7,284,946 | B2 * | 10/2007 | O'Neil | B65H 15/02 414/763 |
| 7,871,236 | B1 * | 1/2011 | Sprott | B65G 65/23 414/763 |
| 8,523,252 | B2 * | 9/2013 | Upshaw | B66C 1/107 294/67.31 |
| 8,608,423 | B2 * | 12/2013 | Hsu | B65G 47/24 414/763 |
| 8,632,296 | B1 * | 1/2014 | Binford | B63B 27/02 414/142.7 |
| 9,139,262 | B1 * | 9/2015 | Skaggs | B65G 47/24 |
| 2003/0091419 | A1 * | 5/2003 | Haas | B66F 9/125 414/607 |
| 2008/0054556 | A1 * | 3/2008 | Obuchi | B65H 29/041 271/279 |
| 2009/0304443 | A1 * | 12/2009 | Moore | F16B 35/041 403/409.1 |
| 2010/0018122 | A1 * | 1/2010 | Hecht | E05D 3/16 49/31 |
| 2010/0032886 | A1 * | 2/2010 | Campbell | B65H 1/266 271/9.01 |
| 2011/0008128 | A1 * | 1/2011 | Soltis | B23B 31/1071 411/348 |
| 2012/0163952 | A1 * | 6/2012 | Hsu | B65G 47/24 414/783 |

FOREIGN PATENT DOCUMENTS

| | | |
|---|---|---|
| JP | S64-43024 | 3/1989 |
| JP | 2002-60050 A1 | 2/2002 |
| JP | 2002-370818 A1 | 12/2002 |
| JP | 2005-89062 A1 | 4/2005 |
| JP | 2006-240864 A1 | 9/2006 |
| JP | 2013-154975 A1 | 8/2013 |

* cited by examiner

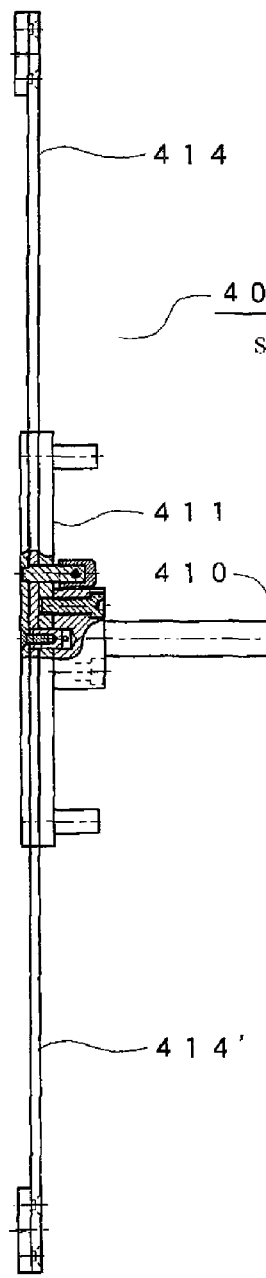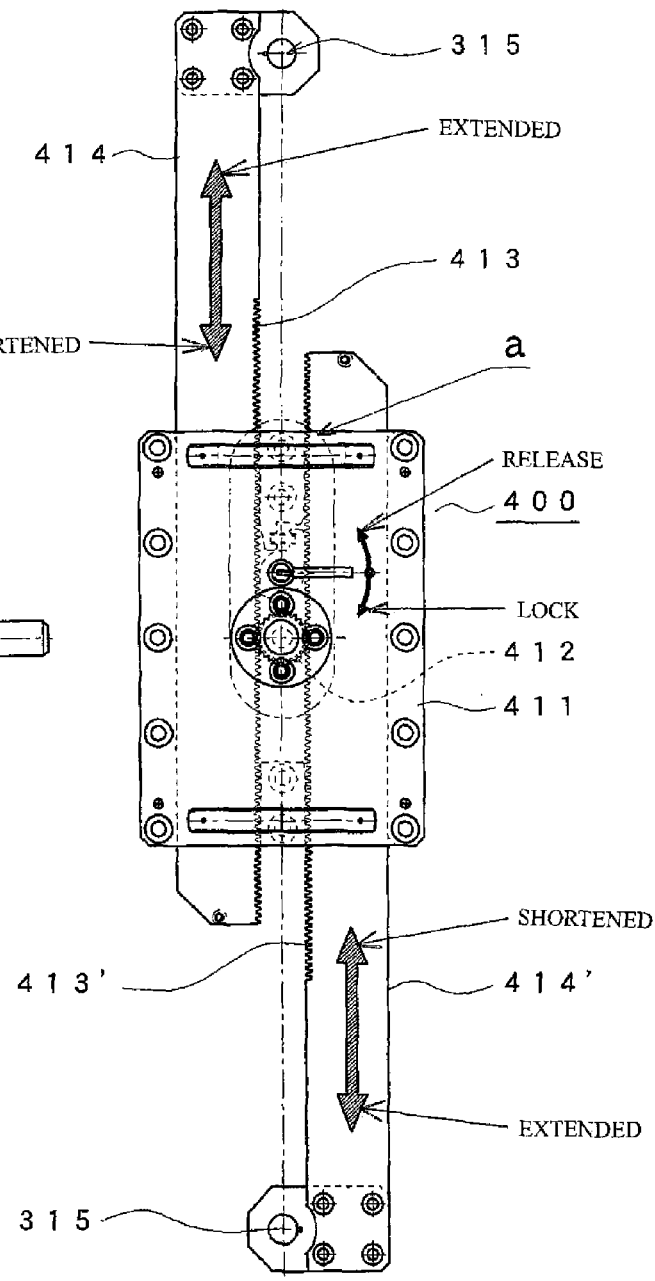

NON-PRINTED PAPER SUPPLY APPARATUS USED FOR SINGLE-SIDE PRINTER

TECHNICAL FIELD

The present invention relates to a non-printed paper supply apparatus used for a single-side printer.

BACKGROUND ART

A printer has included a double-side printer and a single-side printer in the related art. The double-side printer has been extremely expensive and the body of the printer has been large. Therefore, the double-side printer has occupied a large space in the factory. Whereas, the single-side printer is cheaper than the double-side printer, and the occupied place is relatively small.

However, in order to print on both sides of printing paper by using the single-side printer, that is, to perform double-sided printing, first, a number of paper sheets of which one side is printed are waited on a paper ejecting side of the single-side printer. Then, non-printed sides of the paper sheets are faced upward by reversing a plurality of waited paper sheets (8000 to 10000 sheets at a maximum), and it is necessary to print on remaining non-printed surfaces by moving the paper sheets to a paper feeding side of the printer again.

However, the number of the paper sheets to be printed by the printer is large, and it is necessary to bundle an appropriate number of printed paper sheets on the paper ejecting side of the printer and to move and load the paper sheets on the paper feeding side of the printer again. Regarding this work, manual re-loading has been the mainstream, and this has been complicated.

Especially in a case of the large paper size, such as A size, octavo, and duodecimo, the weight increases. In addition, the weight is further increased according to the paper quality. Therefore, the work to reverse and move a large number of paper sheets having large size has required physical strength. This work has been a very heavy work even for skilled workers.

Whereas, there has been a modification of a material reversing machine used when paper sheet is turned from one side (surface) to another side (rear surface) in a double-sided printing work by the printer. For example, Patent Literature 1 discloses above material reversing machine.

However, in the disclosed Patent Literature 1, a special reversing machine has been required. When the stacked paper is sandwiched and held by a hydraulic device and the sandwiched stacked paper is reversed, it is necessary to have a motor as a power source. Further, the reversing machine is a fixed-type reversing machine of which a rotation axis to reverse the sandwiched and held stacked paper is fixed to the reversing machine. The reversing machine is a device which requires power such as the hydraulic device and the motor to operate it. Therefore, the reversing work has not been easily and quickly performed.

Further, for example, Patent Literature 2 discloses the invention of a reversing mechanism of bundled sheets of paper.

However, there has been a reversing mechanism apparatus which has a unit for sandwiching and holding the bundled sheets of paper by a skid placed on the bottom surface and a skid placed on the top, fixing the space between the skids with a plurality of channel members, suspending right and left rotation axes of this by chains, suspending the center of the chains by a balance-shaped bar, suspending it by a power to reverse it having the rotation axis with a ratchet function as the center, and then, reversing it. The bar has not been safely and promptly set.

In addition, there has been a non-printed paper supply apparatus for a single-side printer obtained by the applicant of the present application. For example, Patent Literature 3 discloses the above supply apparatus.

However, in this apparatus, an alignment holding tool and a fastening and reversing tool are attached/detached to/from a pallet which is a paper receiving table with bolts and nuts at some places. Therefore, time and labor have been required for the attaching/detaching work.

CITATION LIST

Patent Literatures

Patent Literature 1: JP 57-067445 A
Patent Literature 2: U.S. Pat. No. 2,656,051
Patent Literature 3: JP 5401566 B1

SUMMARY OF INVENTION

Technical Problem

A purpose of the present invention is to develop and provide a non-printed paper supply apparatus used for a single-side printer which can be easily, promptly, safely, and surely set by further improving a supply apparatus, which is used for the single-side printer which is much cheaper than a double-side printer and which has a smaller occupied area than that of the double-side printer, for paper sheet of which one side is printed and another side is not printed.

Solution to Problem

A non-printed paper supply apparatus used for a single-side printer reverses a plurality of sheets of stacked paper of which one side has been printed so that a non-printed surface comes to an upper surface and supplies the stacked paper to a printer again. The non-printed paper supply apparatus used for the single-side printer includes two pallets which hold the stacked paper from upper and lower sides, a plurality of alignment holding tools which is provided between the pallets and can be adjusted according to a volume of the stacked paper, a pair of fastening and reversing tools including reversing bars in which reversing shafts for reverse are formed on sides of the pallets opposite to each other, and a pair of reverse assisting stands which pivotally supports reversing shafts of each fastening and reversing tool. The alignment holding tool and the fastening and reversing tool are respectively fixed to upper/lower pallets with a fixing tool which can be attached/detached in a single operation.

The fixing tool includes receiving tools which are buried and fixed to edge frames of the upper/lower pallets and fixing pins which is inserted into and fixed to the receiving tools. The fixing pins are inserted into the receiving tools via holes formed on both ends of the alignment holding tool and edges of a rack of the fastening and reversing tool and the fixing pin is slightly rotated in a clockwise or counterclockwise direction and fixed so as to be respectively attached/detached in a single operation.

The receiving tool has a plate in which an insertion hole having a circular hole and a hole for projection connected to the edge of the circular hole is bored and a substantially cylindrical guide tube which has a slit groove having a width to be fit to a position of the hole for projection connected to the circular hole formed on the plate, and the plate and the substantially cylindrical guide tube are provided to be fixed to each other.

In the fixing pin, a projection which is inserted into the slit groove is provided at a front end part of a pin body, and a handle part is provided at an end part.

In the alignment holding tool, a flat plate having an appropriate width is provided, and an external cylinder is formed in a long axis direction of the flat plate. An internal cylinder which can slide with the external cylinder is provided in the external cylinder. The insertion hole of the fixing pin to be fixed to the palette is provided at each front end part of the internal cylinder and the external cylinder. A lock device which fixes or opens the internal cylinder to be slid at an appropriate position is provided in the middle of the external cylinder.

In the lock device, the fixing pin for penetrating a guide groove formed in the internal cylinder is provided in the external cylinder. Further, a handle which fastens and loosens the internal cylinder and the external cylinder by a cam mechanism is provided in the fixing pin.

In the fastening and reversing tool, a pinion is provided in a casing, and reversing bars having racks which are faced to and screwed with the pinion and to which gear cutting is performed are provided by combining with each other. A hole to which the fixing pin of the fixing tool is inserted is provided at each end of the reversing bar, and a temporary stopper for stopping rotation of the pinion is provided. In addition, a shaft is provided at a coaxial position with the pinion in the casing.

The reverse assisting stand includes a pair of bases and supports which are respectively implanted on the bases, and a plurality of projected shaft receivers for fitting with the reversing shaft of the fastening and reversing tool is provided in the support, and the shaft receivers are arranged in a vertical direction.

The base includes a projection member which projects toward outside the base along a slide groove provide in a direction perpendicular to the shaft receivers, and casters.

Advantageous Effects of Invention

According to the present invention, the fixing pin is inserted into the substantially cylindrical guide tube of the receiving tool attached to the mounting hole of each upper/lower pallet by using the fixing tool including the receiving tool and the fixing pin via the insertion holes formed in the alignment holding tool and the fastening and reversing tool, and the fixing pin is slightly rotated. Accordingly, the alignment holding tool and the fastening and reversing tool can be easily, promptly, and surely attached/detached in a single operation, and there is a very beneficial effect.

Further, according to the present invention, the alignment holding tool can set the stacked paper to the receiving tool in which holes facing to the upper/lower pallets are provided so as to slide according to the volume of the stacked paper. The stacked paper can be fixed and surely set by folding the handle of the lock device at the position which matches with the volume of the stacked paper. Further, the stacked paper does not go outside by abutting the flat plate on the side surface of the stacked paper.

Further, according to the present invention, the fastening and reversing tool has the reversing bars with a pair of racks for engaging with a pinion at equal distances and a pinion axis and the reversing shaft are coaxially provided. Accordingly, the reversing shaft can be set at the center of the load, and the fastening and reversing tool can be easily reversed without having an unbalanced load at the time of reversing. Therefore, there is an excellent effect in energy saving and the like.

BRIEF DESCRIPTION OF DRAWINGS

FIG. 2(A) is a perspective view of a fixing pin, and FIG. 2(B) is a perspective view of a receiving tool. FIG. 2(C) is a plan view of the receiving tool.

FIG. 3(A) is a front sectional view, and FIG. 3(B) is a plan sectional view.

FIG. 5(A) is a partially lacked perspective view, and FIG. 5(B) is a diagram of a-a cross section in FIG. 5(A).

FIGS. 7(A) and 7(B) are diagrams of an exemplary fastening and reversing tool used in the present invention. FIG. 7(A) is a front view, and FIG. 7(B) is a partially lacked side view.

DESCRIPTION OF EMBODIMENTS

Figure 1:
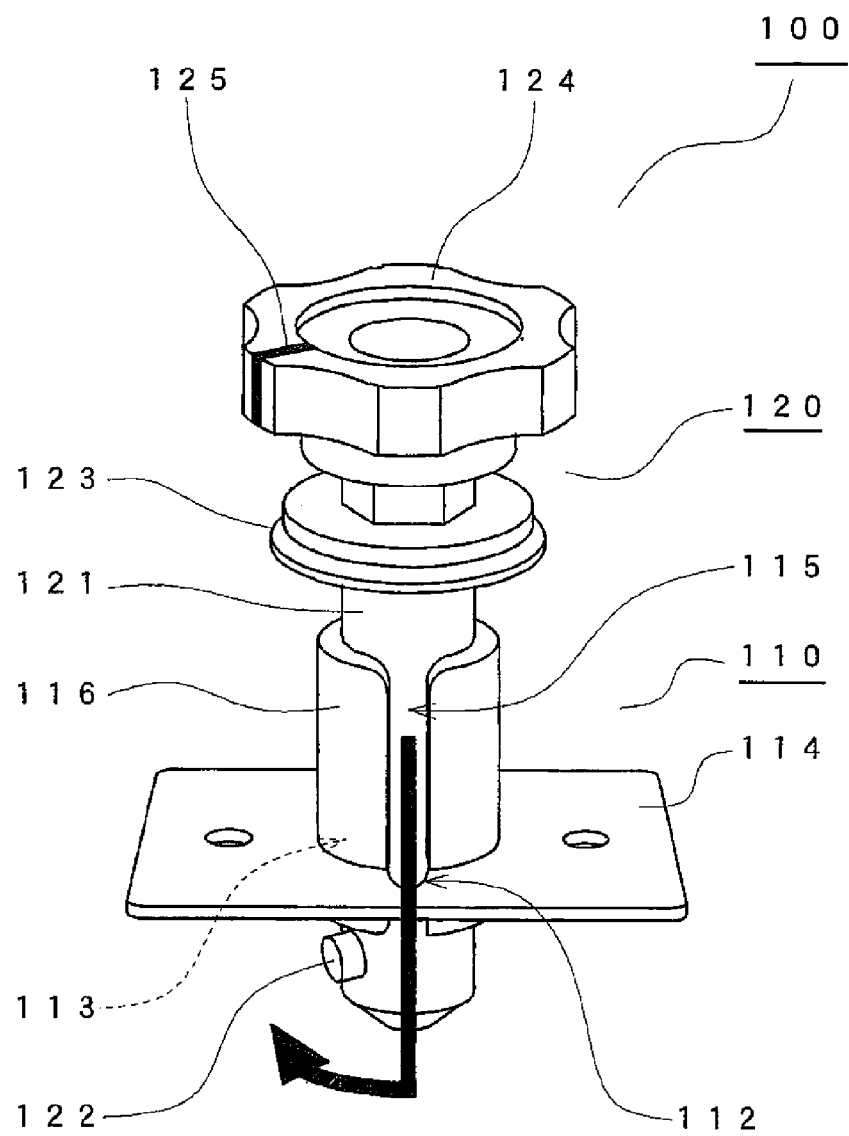
FIG. 1 is a perspective view of an exemplary fixing tool used in the present invention.

A preferred embodiment of the present invention will be described in detail below. However, the present invention is not limited to the following description and may be appropriately changed without departing from the scope of the present invention.

Embodiment

Next, an embodiment of the present invention will be described in detail with reference to the drawings. A supply apparatus (X) reverses stacked paper (Y) so that a non-printed surface comes to an upper surface and supplies the stacked paper (Y) to a printer again. In the stacked paper (Y), a plurality of sheets of paper has been stacked, and one side of each paper sheet has been printed. The non-printed paper supply apparatus for the single-side printer includes two pallets (21) and (22) which hold the stacked paper (Y) from upper and lower sides, a plurality of alignment holding tools (300) which is provided between the pallets and can be adjusted according to a volume of the stacked paper (Y), a pair of fastening and reversing tools (400), and a pair of reverse assisting stands (500) which pivotally supports reversing shaft (410) of each fastening and reversing tool. The fastening and reversing tool (400) includes reversing bars (414 and 414') in which the reversing shafts (410) for reverse are formed on sides of the pallets opposite to each other. The non-printed paper supply apparatus used for the single-side printer attaches/detaches upper/lower ends of the alignment holding tool (300) and the fastening and reversing tool (400) to the upper/lower pallets (21) and (22) to which the stacked paper (Y) is mounted by respectively using the fixing tools (100) in a single operation.

As illustrated in FIG. 1, the fixing tool (100) includes a receiving tool (110) and a fixing pin (120). These elements will be described in detail below.

Figure 2A:
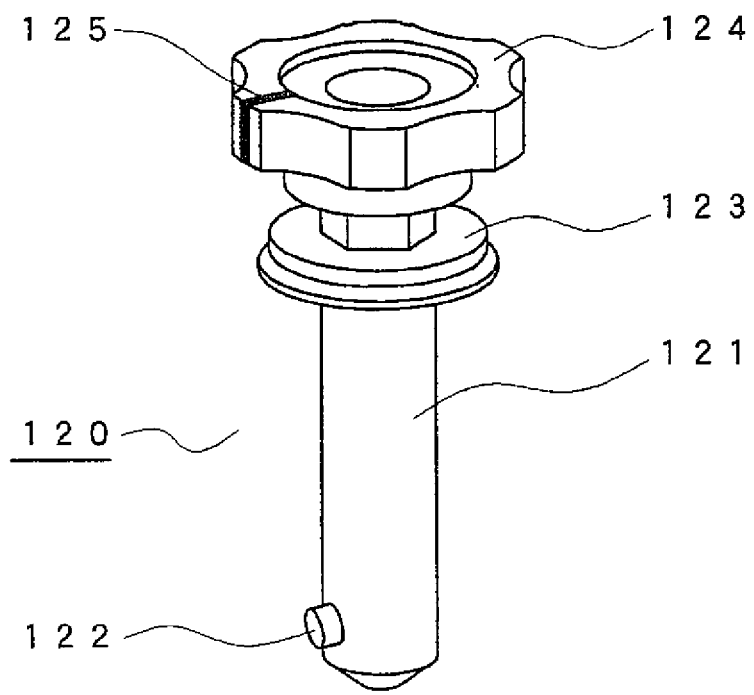
FIGS. 2(A) to 2(C) are views of an exemplary fixing tool used in the present invention.
Figure 2B:
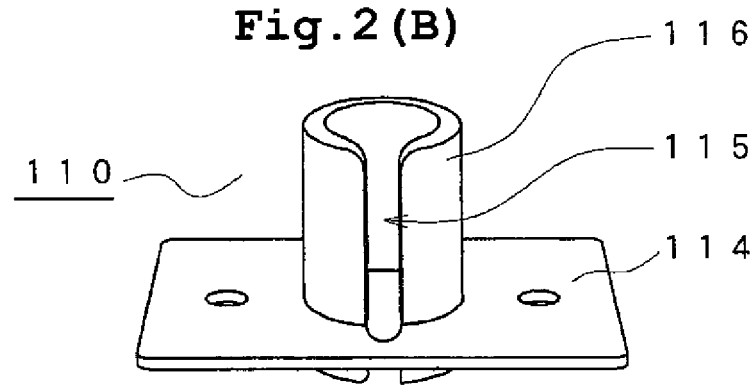
Figure 2C:
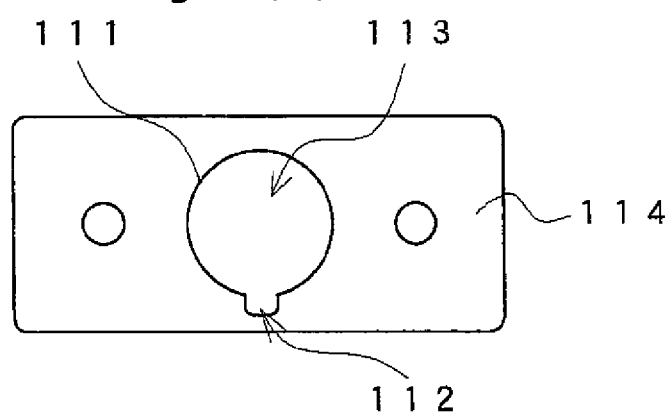
Figure 3A:
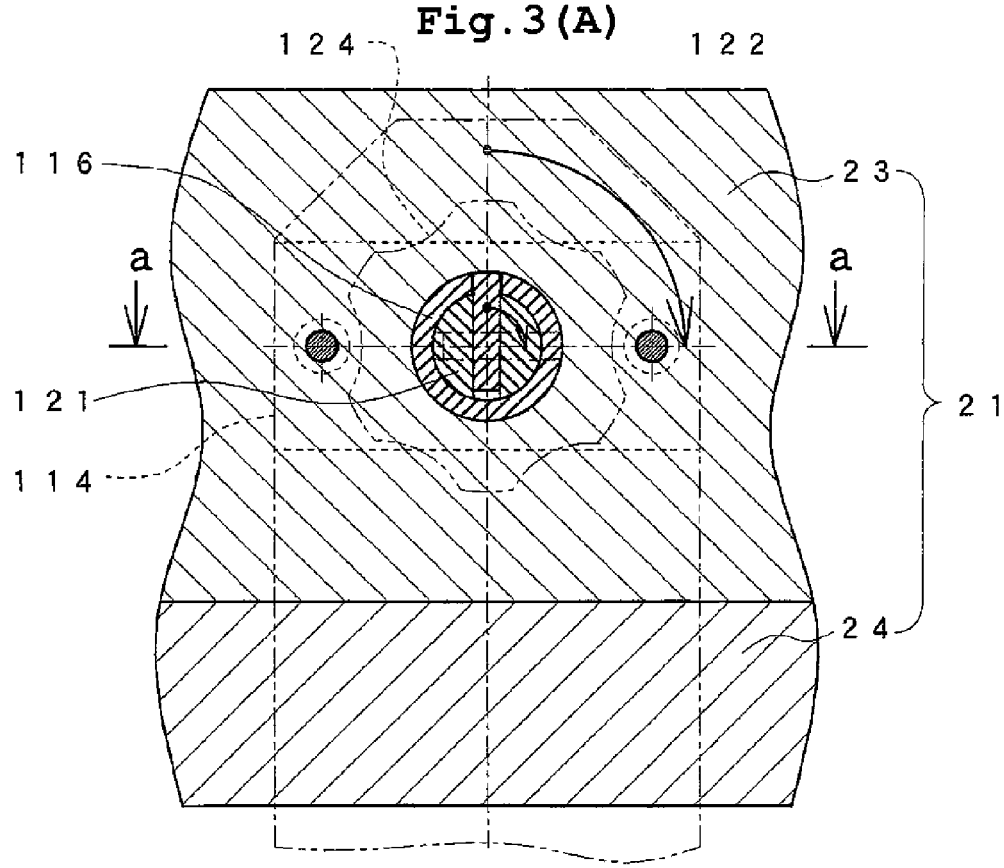
FIGS. 3(A) and 3(B) are view of a use state of the fixing tool used in the present invention.
Figure 3B:
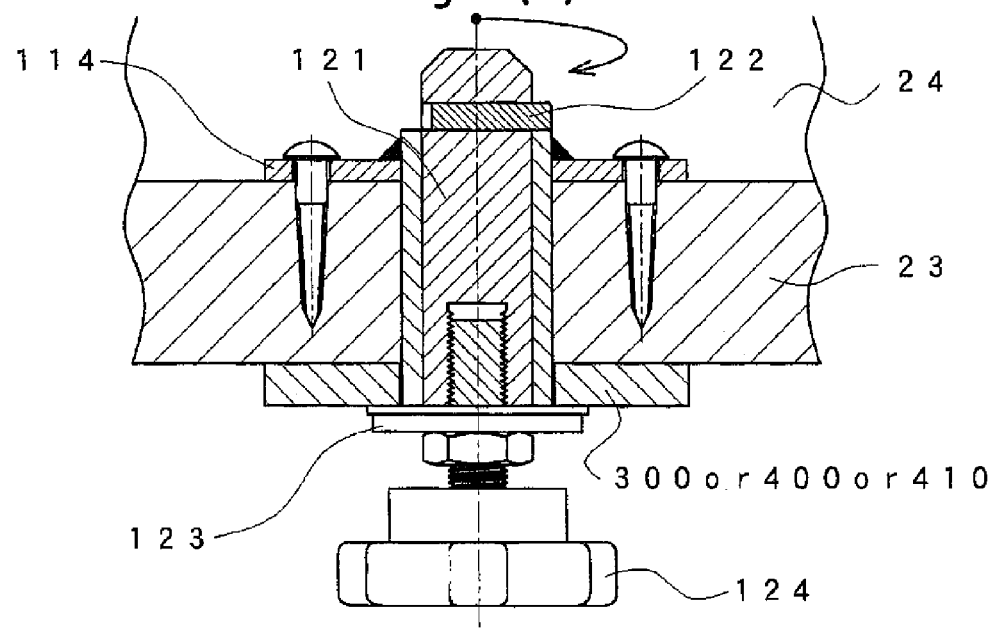
Figure 4:
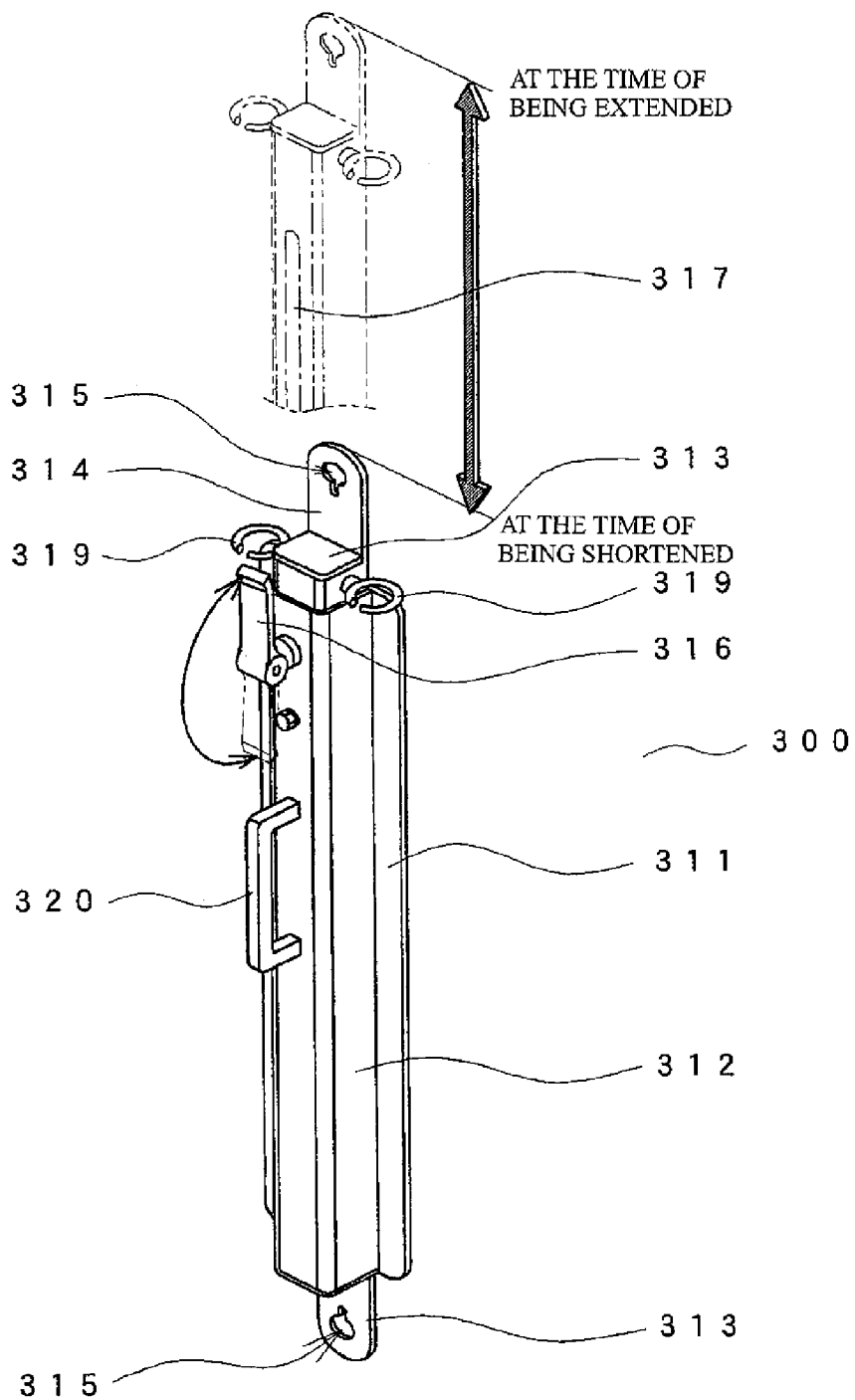
FIG. 4 is a perspective view of an exemplary alignment holding tool used in the present invention.

First, as illustrated in FIGS. 2(A) to 2(C), the receiving tool (110) includes a plate (114) in which an insertion hole (113) is bored and a substantially cylindrical guide tube (116) which fits the position of the hole for projection (112) connected to the circular hole (111) formed on the plate with a slit groove (115). The insertion hole (113) has a circular hole (111) and a hole for projection (112) which is connected to the end of the edge of the circular hole (111). A front end of the guide tube is inserted into the plate (114) and fixed.

In the fixing pin (120), a projection (122) which can be inserted into the slit groove (115) is provided near a front end part of the pin body (121), and a handle part (124) is provided at the end part of the pin body (121) via a washer (123). A mark (125) indicating a position angle of the projection (122) is provided on the handle part so as to find the position angle of the projection.

Further, the substantially cylindrical guide tube (116) is provided to be projected from the plate (114). Both corner parts of the front end of the substantially cylindrical guide tube (116) are formed in a round shape so as to easily insert the projection (122) into the slit groove (115). Further, at the end of the substantially cylindrical guide tube (116), a gradient is formed of which the edge gradually goes higher according to the movement of the projection (122) from the position of the slit groove (115) along the peripheral part of the substantially cylindrical guide tube (116). Accordingly, the fixing pin (120) is firmly and temporarily fastened and fixed to the receiving tool (110).

The receiving tool (110) is inserted into a mounting hole (Z) provided in outer frame members (23) of the both upper/lower pallets (21) and (22) and fixed to the plate (114). A plurality of mounting holes (Z) is provided in the outer frame members (23). The front end of the substantially cylindrical guide tube (116) is provided to be on the same surface as the outer surface of the outer frame member (23).

Further, the structures of the upper/lower pallets (21) and (22) will be described. Both pallets have substantially same structure. The pallet which covers the upper surface of the stacked paper (Y) is the upper pallet (21), and the pallet which is placed under the lower surface of the stacked paper (Y) is the lower pallet (22). These pallets are configured of flat plates (24) and the outer frame members (23).

Each flat plate (24) of the upper/lower pallets (21) and (22) has the same size and vertical/horizontal length as those of the stacked paper (Y). Accordingly, dedicated pallets for the flat plates which respectively match with paper sizes of the stacked paper (Y) having different sizes are provided. For example, the paper size is A size, octavo, and duodecimo.

Figure 5:
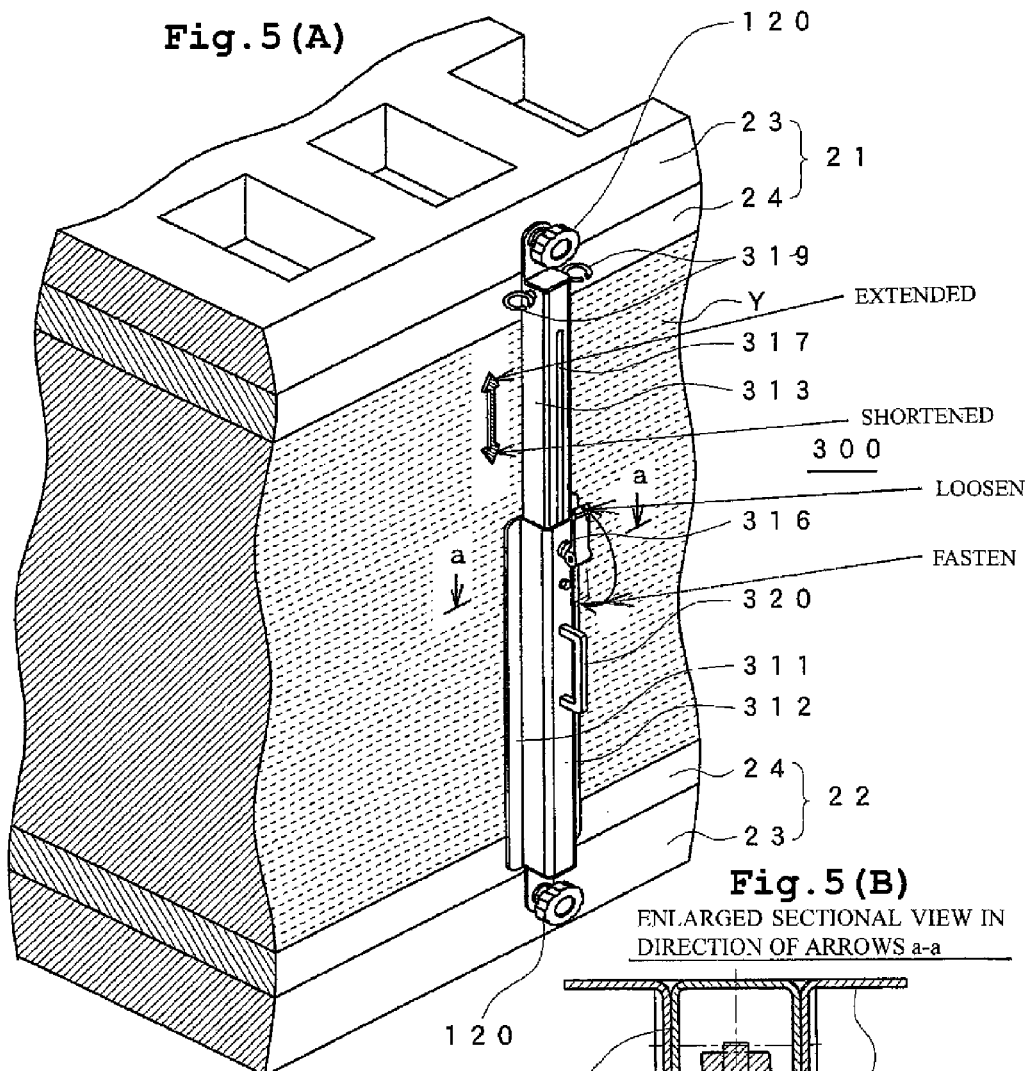
FIGS. 5(A) and 5(B) are diagrams of a mounting state of the alignment holding tool used in the present invention.
Figure 6:
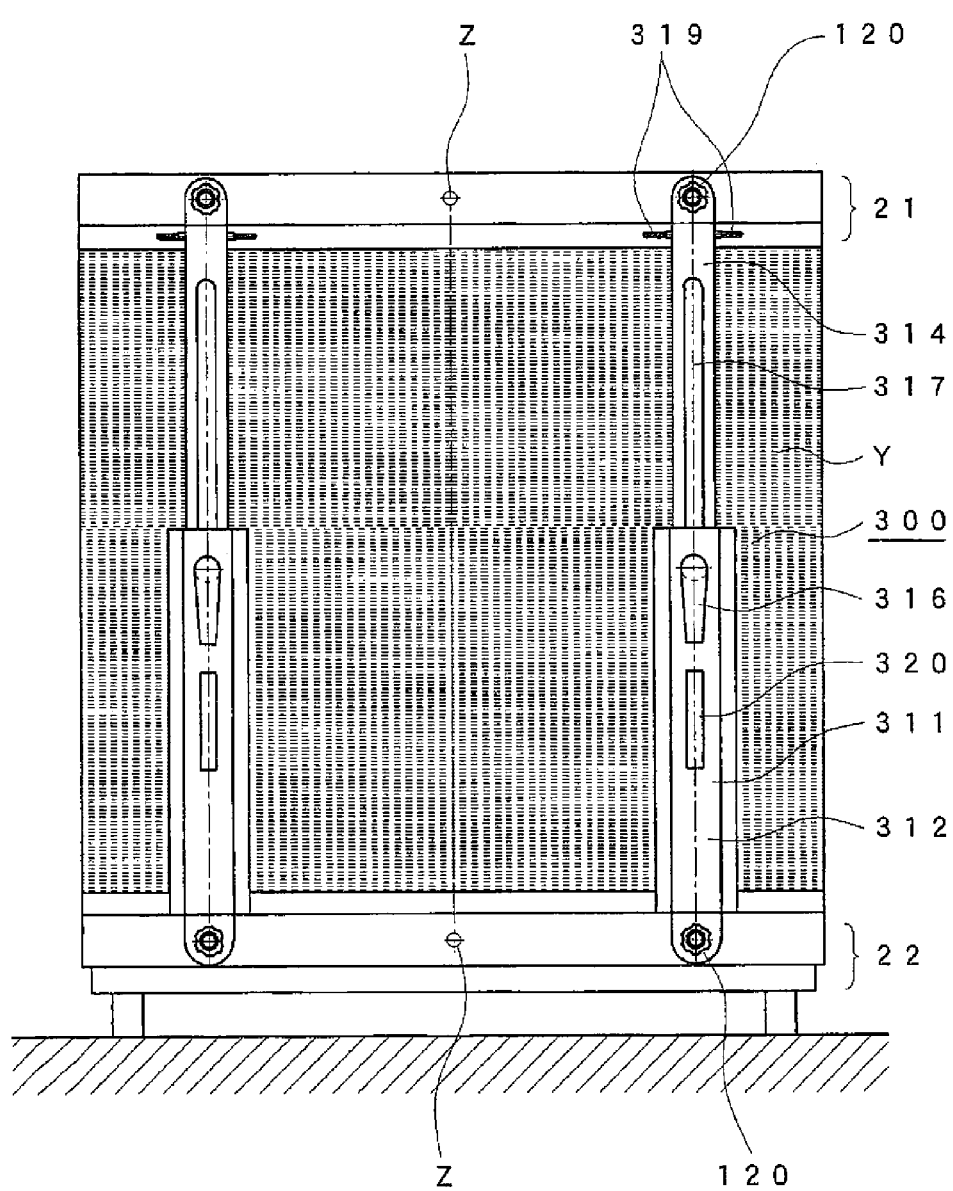
FIG. 6 is a front view of the mounting state of the alignment holding tool used in the present invention.

Surface circumferences of the pallets (21) and (22) are surrounded by the respective outer frame members (23). As illustrated in FIG. 5(A), the outer frame member reinforces the inner side of each pallet in a lattice shape. An appropriate number of the receiving tools (110) of the fixing tool (100) are fixed to the outer frame member (23) provided around the flat plate (24).

Further, the fixing pins (120) are inserted into the both end sides of the alignment holding tool (300) and the reversing bars (414 and 414') of the fastening and reversing tool (400) via the insertion holes (315) formed in the respective ends and slightly rotated in a clockwise or counterclockwise direction and fixed. Accordingly, they can be attached/detached in a single operation.

In addition, a flat plate (311) which has an appropriate width is provided in the alignment holding tool (300), and an external cylinder (312) is formed in a long axis direction of the flat plate. An internal cylinder (313) which can slide with the external cylinder is provided in the external cylinder, and a guide groove (317) is provided in the internal cylinder. Further, the insertion hole (315) to which the fixing pin (120) to be fixed to the pallets (21) and (22) is inserted is provided at each front end part of the external cylinder. A lock mechanism which fixes or opens the internal cylinder (313) to be slid at an appropriate position is provided in the middle of the external cylinder (312).

In addition, regarding the lock mechanism, a fixing bar (318) for penetrating through the guide groove (317) formed in the internal cylinder (313) is provided in the external cylinder (312). Further, a camshaft handle (316) is provided which fastens and loosens the internal cylinder (313) and the external cylinder (312) by a cam mechanism of the fixing bar (318).

In addition, a storage ring (319) to which the fixing pin (120) of the fixing tool (100) is inserted and stored is provided at each front end of the internal cylinder (313) of the alignment holding tool (300). A channel-shaped frame provided in the center of the external cylinder (312) is a handle (320) to move.

Figure 8:
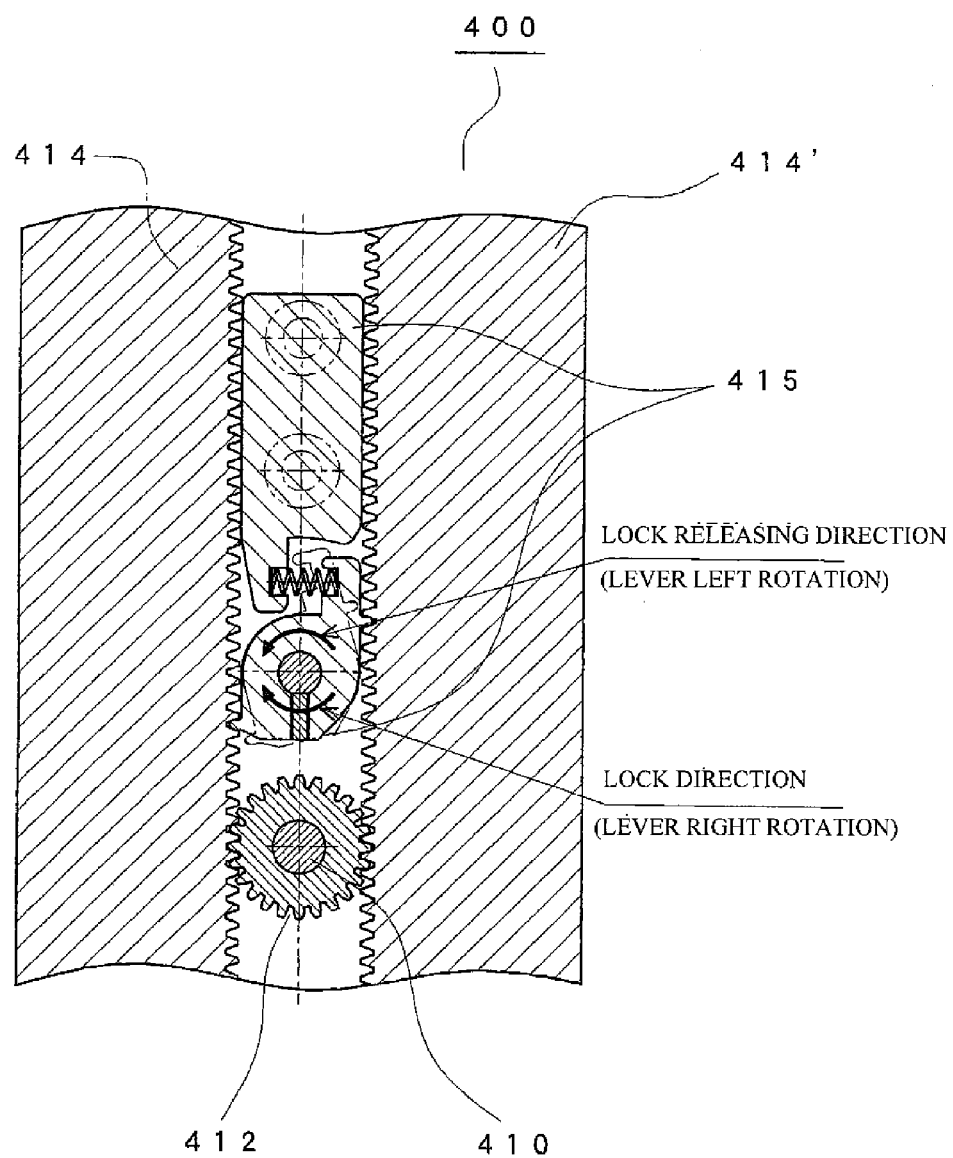
FIG. 8 is a partially lacked enlarged sectional view of the fastening and reversing tool used in the present invention.
Figure 9:
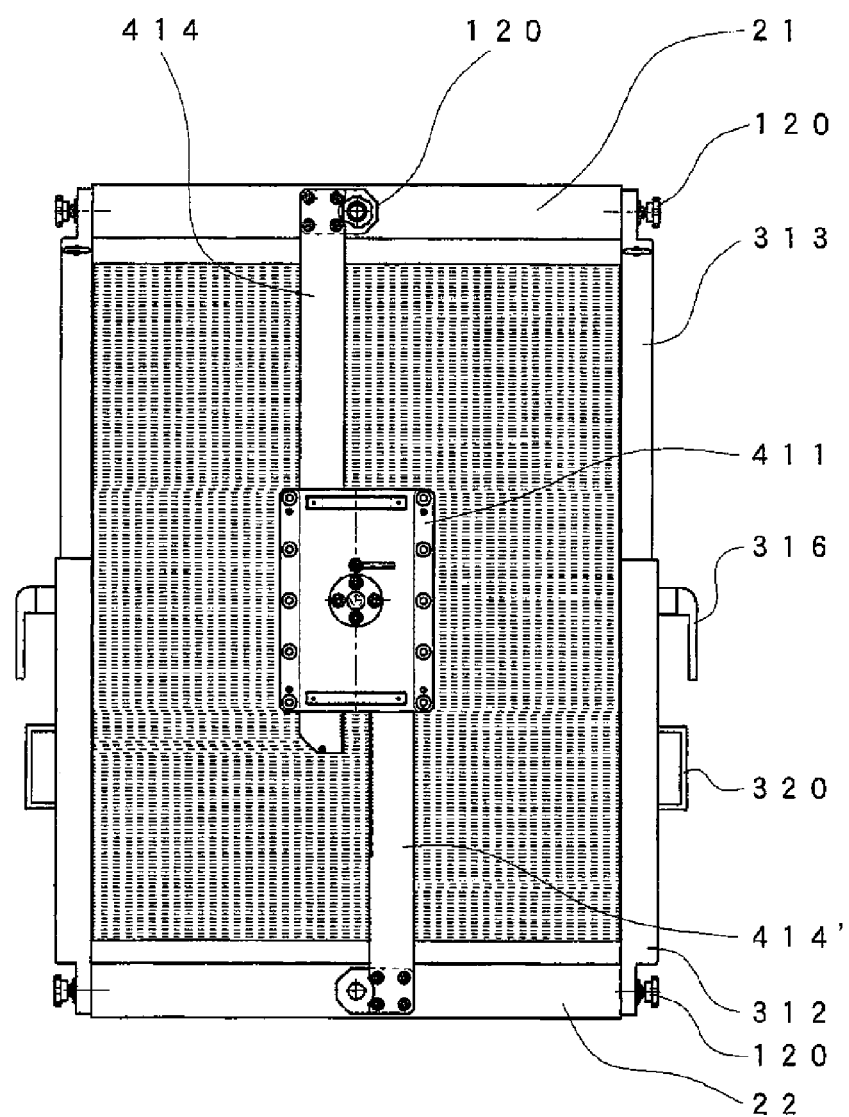
FIG. 9 is a front view of a mounting state of the fastening and reversing tool used in the present invention.

As illustrated in FIGS. 7(A) and 7(B) and FIG. 8, the fastening and reversing tool (400) has a pinion (412) at the center of a casing (411). The reversing bars (414) and (414') are provided by being engaged with each other. The reversing bars (414) and (414') are respectively formed on the side surfaces of racks (413 and 413') which are faced to and screwed with the pinion and to which gear cutting is performed. The insertion hole (315) to which the fixing pin (120) of the one-touch fixing tool (100) is inserted is provided at each end of the reversing bars. Further, a temporary stopper device (415) for stopping the rotation of the pinion (412) is provided. In addition, the reversing shaft (410) is provided at a coaxial position with the pinion in the casing (411).

Figure 10:
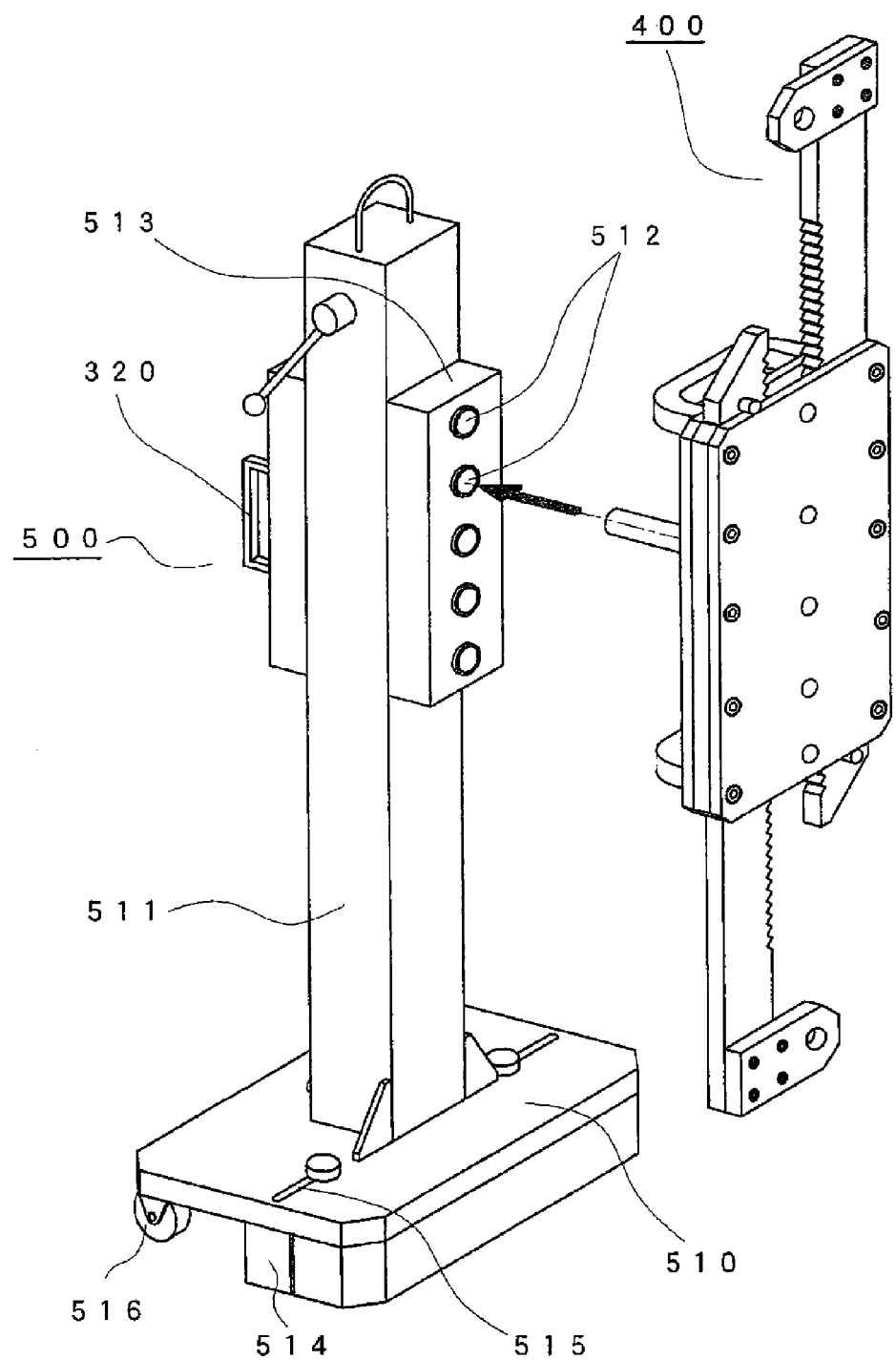
FIG. 10 is a perspective view of a reverse assisting stand used in the present invention.
Figure 11:
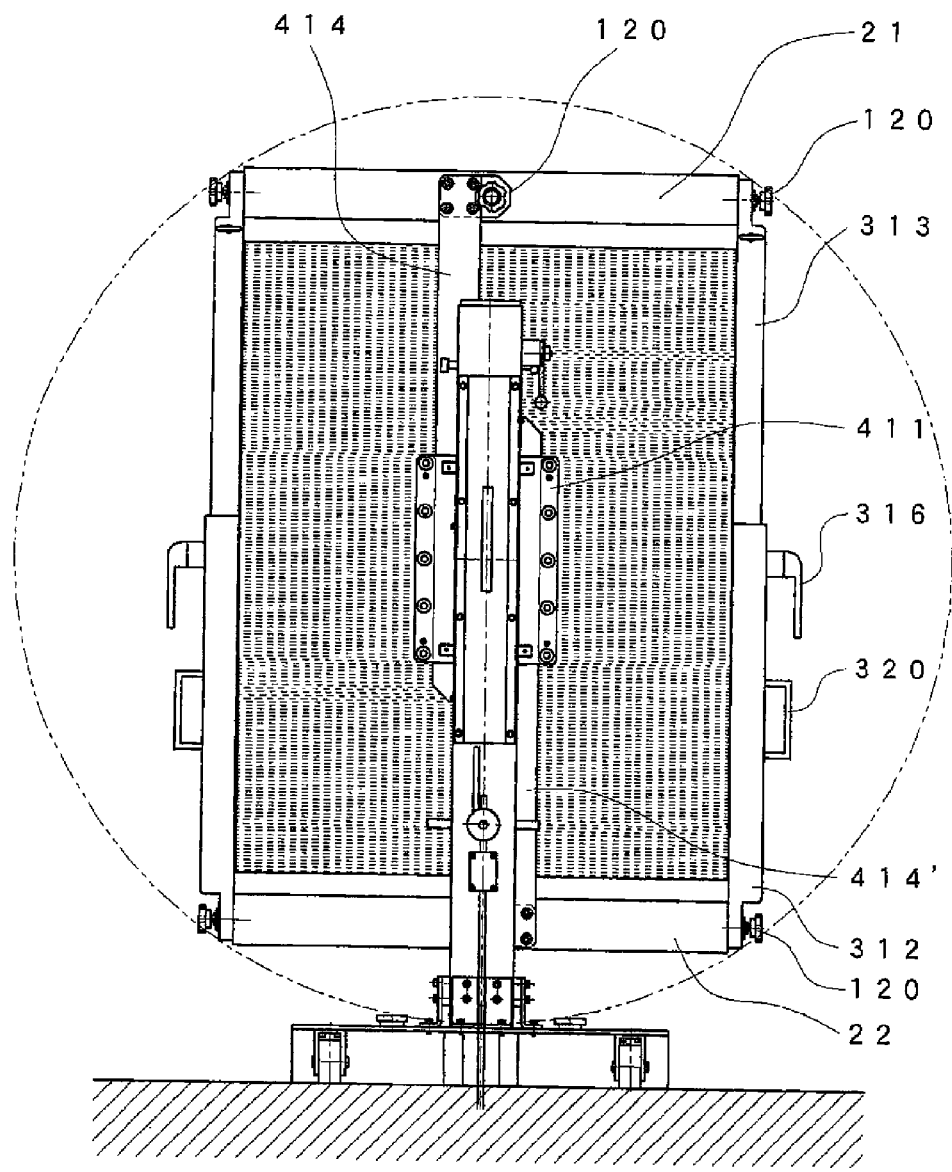
FIG. 11 is a front view of a mounting state of the reverse assisting stand used in the present invention.
Figure 12:
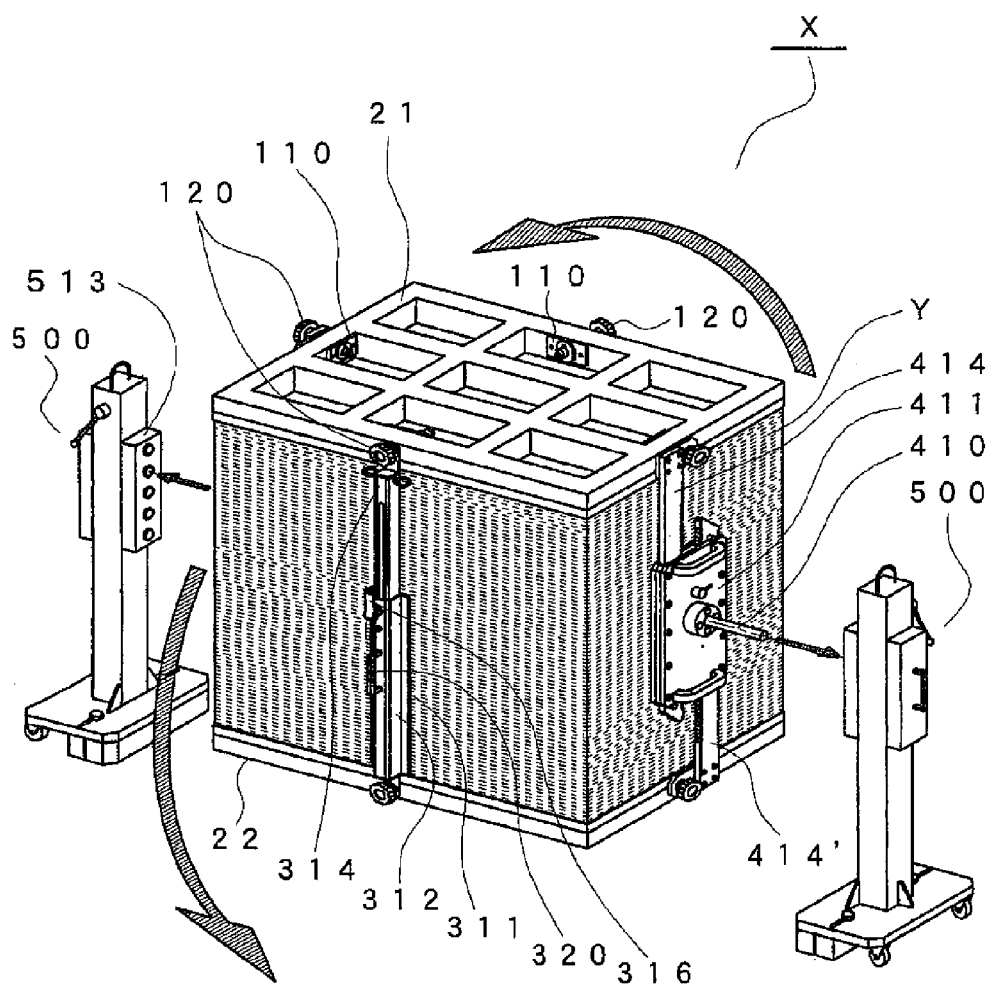
FIG. 12 is a perspective view of a use state of the present invention.

In addition, as illustrated in FIG. 12, the reverse assisting stand (500) includes a pair of bases (510). As illustrated in FIGS. 10 to 12, a support (511) is implanted on the base. A plurality of shaft receivers (512) is provided in the support, and the shaft receivers are arranged in a vertical direction. The shaft receiver has a hole diameter and length for fitting with the reversing shaft (410) of the fastening and reversing tool (400). The shaft receiver (512) placed at an appropriate height position is selected and used according to the volume of the stacked paper (Y).

The respective shaft receivers (512) are integrally covered with a cover (513), and only holes of the shaft receivers (512) can be seen from outside. A projection member (514) is provided under the support (511) of the base (510), and the projection member (514) is projected toward outside the base (510) along a slide groove (515) provided in a direction perpendicular to the shaft receivers (512) so as to prevent the reverse assisting stand (500) from falling down. Further, casters (516) are provided on the bottom of the base (510) and the support (511) of the assisting stand (500) is inclined so that the reverse assisting stand (500) can easily move by using the casters (516).

As indicated by an arrow in FIG. 12, the stacked paper (Y) is reversed by the above apparatus, and the pallets (21 and 22) which sandwich and hold the reversed stacked paper (Y) are received by a pallet hand lifter (tool to move the pallet on which a load is placed) on the market. The fixing tools (100) fixed to each member such as the alignment holding tool (300) and the fastening and reversing tool (400) mounted on the pallets (21 and 22) are detached in a single operation, and the pallet (21) positioned under the lower side of the stacked paper (Y) is removed. Then, the stacked paper (Y) is loaded on a paper feeding base on the paper feeding side of the single-side printer in a state where the stacked paper (Y) placed on the pallet (22) positioned on the upper surface is placed on the pallet hand lifter. Accordingly, the rear surfaces are sequentially printed.

INDUSTRIAL APPLICABILITY

According to the present invention, a technique of the non-printed paper supply apparatus used for the single-side printer is established, and a large number of non-printed paper supply apparatuses used for the single-side printer are manufactured, used, and sold based on the above. Accordingly, the present invention has and industrial applicability.

REFERENCE SIGNS LIST 21 upper pallet
22 lower pallet
23 outer frame member
24 flat plate
100 fixing tool
110 receiving tool
111 circular hole
112 hole for projection
113 insertion hole
114 plate
115 slit groove
116 substantially cylindrical guide tube
120 fixing pin
121 pin body
122 projection
123 washer
124 handle part
125 mark
300 alignment holding tool
311 flat plate
312 external cylinder
313 internal cylinder
314,314' fixing bar
315 insertion hole
316 camshaft handle
317 guide groove
318 fixing bar
319 storage ring
320 handle
400 fastening and reversing tool
410 reversing shaft
411 casing
412 pinion
413,413' rack
414,414' reversing bar
415 stopper device
500 reverse assisting stand
510 base
511 support
512 shaft receiver
513 cover
514 projection member
515 slide groove
516 caster
X supply apparatus
Y stacked paper
Z mounting hole

The invention claimed is:

1. A non-printed paper supply apparatus used for a single-side printer for reversing a stacked paper, in which a plurality of sheets of paper has been stacked and one side of each paper sheet has been printed, so that a non-printed surface comes to an upper surface and supplying the stacked paper to a printer again, comprising:
   two pallets configured to sandwich and hold the stacked paper from upper and lower sides thereof;
   a plurality of alignment holding tools configured to be provided between the pallets and be adjusted according to a volume of the stacked paper;
   a pair of fastening and reversing tools configured to include reversing bars in which reversing shafts are formed on sides of the pallets opposite to each other; and
   a pair of reverse assisting stands configured to pivotally support the reversing shafts of the fastening and reversing tools,
   wherein:
   a fixing tool, which attaches or detaches the alignment holding tool and the fastening and reversing tool with the respective upper and lower pallets, includes receiving tools which are fixed to edge frames of the upper and lower pallets and at least a fixing pin to be inserted into and fixed to the receiving tools, the fixing tool being respectively mounted on the pallets,
   the fixing pins are inserted into the receiving tools via holes formed on both ends of the alignment holding tool and edges of a rack of the fastening and reversing tool,
   the alignment holding tool and the fastening and reversing tool are attached or detached with the respective upper and lower pallets by slightly rotating the fixing pin in a clockwise or counterclockwise direction and fixing thereof,
   the receiving tool has a plate with an insertion hole having a circular hole and a projected hole connected to the edge of the circular hole and a substantially cylindrical guide tube which has a slit groove having a width to be fit to a position of the projected hole connected to the circular hole formed on the plate, and the plate and the substantially cylindrical guide are provided to be fixed to each other, and
   in the fixing pin, a projection member which is inserted into the slit groove is provided at a front end part of a pin body, and a handle part is provided at an end part.

2. The non-printed paper supply apparatus used for a single-side printer according to claim 1, wherein
   in the fastening and reversing tool, a pinion is provided at a center of a casing,
   reversing bars having racks which are faced to and screwed with the pinion and to which gear meshing is performed therebetween,
   a hole to which the fixing pin of the fixing tool is inserted is provided at each end of the reversing bar,
   a temporary stopper for stopping rotation of the pinion is provided, and
   in addition, a shaft is provided at a coaxial position with the pinion in the casing.

3. The non-printed paper supply apparatus used for a single-side printer according to claim 1, wherein
the reverse assisting stand includes a pair of bases and supports which are respectively implanted on the bases, and
a plurality of projected shaft receivers for fitting with the reversing shaft of the fastening and reversing tool is provided in the support, and the shaft receivers are arranged in a vertical direction.

4. The non-printed paper supply apparatus used for a single-side printer according to claim 3, wherein
the base includes a projection member which projects toward outside the base along a slide groove provided in a direction perpendicular to the shaft receivers, and casters.

* * * * *